3,503,968
2-N-MORPHOLINO ALKYL INDOLE
CARBOXAMIDES
William Blythe Wright, Jr., Woodcliff Lake, N.J., assignor to American Cyanamid Company, Stamford, Conn., a corporation of Maine
No Drawing. Continuation-in-part of application Ser. No. 542,758, Apr. 15, 1966. This application Sept. 9, 1968, Ser. No. 758,620
Int. Cl. C07d 87/42
U.S. Cl. 260—247.2        10 Claims

ABSTRACT OF THE DISCLOSURE

The preparation of morpholinoalkylene-2-indole carboxamides from an indole carboxylic acid by reaction with a halogenating agent and subsequently with a substituted alkylenediamine, is described. Other methods are described. For example, by the preparation of a reactive indole-2-carboxamide which is reacted with a substituted alkylenediamine. The morpholinoalkylene-2-indole carboxamides are useful for their anti-depressant properties.

---

This is a continuation-in-part of my application serial No. 542,758, filed Apr. 15, 1966, now abandoned.

This invention relates to new organic compounds. More particularly, it relates to morpholinoalkylene-2-indole carboxamides and methods of preparing the same.

The novel compounds of the present invention may be illustrated by the following formula:

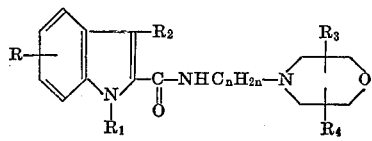

wherein R is selected from the group consisting of hydrogen, lower alkyl, halogen and trifluoromethyl; $R_1$ is selected from the group consisting of hydrogen, lower alkyl and lower alkenyl; $R_2$, $R_3$ and $R_4$ are selected from the group consisting of hydrogen and lower alkyl; $n$ is an integer from 2 to 4; pharmaceutically acceptable acid addition salts thereof. The term loweralkyl is intended to include those having 1 to 4 carbon atoms.

The free basis of this invention, in general, may be either liquids or solids at room temperature. The free bases are, in general, relatively insoluble in water, but soluble in most organic solvents such as lower alkyl alcohols and benzene, acetone, chloroform, and the like. These compounds form acid addition salts with strong acids, such as hydrochloric acid, sulfuric acid, perchloric acid, and the like. The compounds also form salts with organic acids, as for example, fumaric and maleic acid. Such salts, in general, are soluble in water, methanol and ethanol, but relatively insoluble in benzene, ether, petroleum ether, and the like.

The compounds of this invention may be prepared by the following method which has been found most desirable.

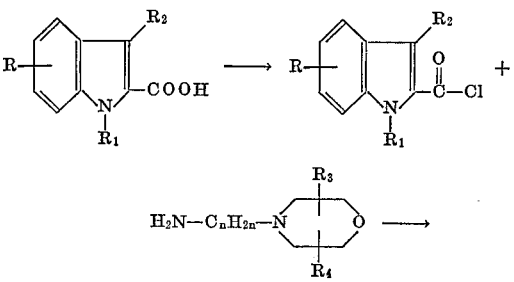

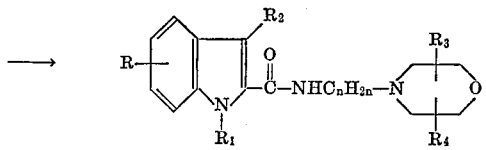

wherein R, $R_1$, $R_2$, $R_3$, $R_4$, and $n$ are as defined above.

In this process, the indole carboxylic acid is reacted with halogenating agent such as thionyl chloride in an inert solvent. The indole carboxylic acid chloride is isolated and reacted with an alkylenediamine derivative. The products are recovered and purified by recrystallization from a suitable solvent. Alternatively, an ester or acid anhydride may be prepared as the intermediate.

The compounds of the present invention can also be prepared by other methods. One of these involves the preparation of a reactive indole-2-carboxamide as an intermediate followed by reaction with the alkylene diamine.

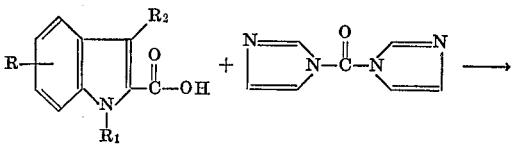

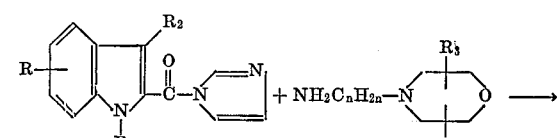

wherein R, $R_1$, $R_2$, $R_3$, $R_4$ and $n$ are as hereinbefore defined. This reaction is best carried out in two steps and tetrahydrofuran is a satisfactory solvent. A temperature range of 25–75° C. is most desirable.

The anti-depressant properties of the compounds of the present invention are evident by measuring the ability to counteract in animals a depression induced by the administration of tetrabenazine hexamate. Graded doses of these compounds are administered intraperitoneally to groups of mice. One hour later tetrabenazine hexamate (a well-known agent capable of producing a profound depression) is administered at a dose which is known to depress exploratory behavior in groups of normal mice. The following tests were carried out: Doses of 25 milligrams per kilogram of the test compounds are administered intraperitoneally to 5 mice one hour before the administration of tetrabenazine hexamate at a dose of 30 mg./kg. (intraperitoneal) which is known to depress markedly the exploratory behavior of normal mice. Thirty minutes later the mice are tested for their exploratory behavior. If 4 or more of 15 mice show exploratory behavior (significant P=less than 0.05), then graded doses of the active test compounds are administered to additional groups of 5 mice. The antidepressant treated groups show normal exploratory behavior, while the control groups and groups treated with an ineffective anti-depressant agent, do not show this normal exploratory behavior, but show the well known, profound depression induced by tetrabenazine. The results from several dose levels are used to establish effective dose ranges. This method has been described by Greenblatt, E. N. and Osterberg, A. C. in Toxicology and Applied Pharmacology 7, pp. 566–578, (1965).

The results of the above testing are accurately summarized in Table I as follows:

TABLE I.—REVERSAL OF TETRABENAZINE HEXAMATE DEPRESSION

| Compound | Range of Active Doses (mg./kg.) Intraperitonael |
|---|---|
| (I) 4-chloro-N-(2-morpholinoethyl)-2-indolecarboxamide | 6.25-25 |
| (II) 5-chloro-N-(2-morpholinoethyl)-2-indolecarboxamide | 12.5-25 |
| (III) 5-bromo-N-(2-morpholinoethyl)-2-indolecarboxamide | 12.5-25 |
| (IV) 6-chloro-N-(2-morpholinoethyl)-2-indolecarboxamide | 3.125-25 |
| (V) 6-chloro-N-(3-morpholinopropyl)-2-indolecarboxamide | 6.25-25 |
| (VI) N-(2-morpholinoethyl)-2-indolecarboxamide hydrochloride | 3.1-25 |
| (VII) N-(3-morpholinopropyl)-2-indolecarboxamide hydrochloride | 12.5-25 |
| (VIII) 1-methyl-N-(2-morpholinoethyl)-2-indolecarboxamide hydrochloride | 12.5-25 |
| (IX) 1-methyl-N-(3-morpholinopropyl)-2-indolecarboxamide hydrochloride | 1.56-25 |

These compounds compare favorably with effective antidepressant drugs such as imipramine and amitryptyline when tested by the above techniques.

The morpholinoalkylene-2-indolecarboxamides may be administered to warm-blooded animals, orally, or parenterally if desired, and when so administered, may be considered as an anti-depressant agent for therapeutically desirable treatment of depression in warm-blooded animals. The dosage regimen can be adjusted to provide optimum therapeutic response. Thus, for example, several doses may be administered daily, or the dose may be reduced proportionately as indicated by the requirements of the particular therapeutic situation.

For therapeutic administration the active compounds of this invention may be incorporated with pharmaceutical carriers such as excipients and used, for example, in the form of tablets, dragées, capsules, suppositories, liquids, elixirs, emulsions, suspensions, syrups, chocolate, candy, wafers, chewing gum, or the like. Such compositions and preparations should contain at least 0.1% of active component. The percentage of the compositions and preparations, may, of course, be varied, and may conveniently be between 2% and 60% or more of the weight of the unit. The amount of active component in such therapeutically useful compositions or preparations is such that a suitable dosage will be obtained. Preferred compositions or preparations according to the present invention are prepared so that a dosage unit form contains between about 5 and about 100 milligrams of the morpholinoalkylene-2-indolecarboxamides.

The products of this invention are physiologically active as anti-depressants. As such, they can be incorporated in various pharmaceutical forms such as tablets, capsules, pills, and so forth, for immediate or sustained release, by combining with suitable pharmaceutical carriers. They may be in the form of dosage units for a single therapeutic dose or in small units for multiple dosages or in larger units for division into single doses. Obviously, in addition to the therapeutic anti-depressant compound there may be present excipients, binders, fillers, and other therapeutically inert ingredients necessary in the formulation of the desired pharmaceutical preparation.

The following specific examples illustrate the preparation of representative compounds of the present invention. Parts are by weight unless otherwise indicated.

EXAMPLE 1

Preparation of 6-chloro-N-(2-morpholinoethyl)-2-indolecarboxamide

A mixture of 26 parts of 6-chloroindole-2-carboxylic acid, 500 parts of ether and 50 parts of thionyl chloride is stirred at room temperature for 8 hours and then concentrated to remove the solvent and excess thionyl chloride. The crystalline residue is crude 6-chloroindole-2-carbonyl-chloride and is used in the next step without further purification.

A solution of 10.7 parts of the 6-chloroindole-2-carbonyl chloride in 100 parts of ether is added dropwise with stirring and cooling to a solution of 13 parts of N-(2-aminoethyl)-morpholine in 100 parts of ether. The mixture is allowed to stand at room temperature for 20 hours and then stirred with 50 parts of 2 N sodium hydroxide solution. The precipitate is filtered off and washed with water and then with a little ether. Recrystallization from 300 parts by volume of ethanol results in 11.6 parts of 6-chloro-N-(2-morpholinoethyl)-2-indolecarboxamide, melting point 229°–231° C. The hydrochloride melts at 260–262° C.

EXAMPLE 2

Preparation of 6-chloro-N-(2-morpholinoethyl)-2-indolecarboxamide

A mixture of 11.2 parts of ethyl 6-chloroindole-2-carboxylate, 9 parts of N-(2-aminoethyl)morpholine and 0.2 part of sodium methylene is heated at 115°–125° C. for 2½ hours and cooled. The mixture is triturated with ether and filtered. The crystalline product is recrystallized from ethanol.

EXAMPLE 3

Preparation of 5-chloro-N-(2-morpholinoethyl)-2-indolecarboxamide

The above compound, melting point 218°–220° C., is obtained when 5-chloroindole-2-carboxylic acid is substituted for 6-chloroindole-2-carboxylic acid in the procedure of Example 1. The hydrochloride salt melts at 263–265° C.

EXAMPLE 4

Preparation of 4-chloro-N-(2-morpholinoethyl)-2 indolecarboxamide

When 4-chloroindole-2-carboxylic acid is substituted for 6-chloroindole-2-carboxylic acid in the procedure of Example 1, the above compound, melting point 212°–214° C. is obtained. The hydrochloride melts at 219–221° C.

EXAMPLE 5

Preparation of 5-bromo-N-(2-morpholinoethyl)-2-indolecarboxamide

If 5-bromoindole-2-carboxylic acid is substituted for 6-chloroindole-2-carboxylic acid in the procedure of Example 1, the above compound, melting point 233°–235° C., is obtained. The hydrochloride melts at 276–278° C.

EXAMPLE 6

Preparation of 6-fluoro-N-(2-morpholinoethyl)-2-indolecarboxamide

The compound is obtained when 6-fluoroindole-2-carbonyl chloride is reacted with N-(2-aminoethyl)morpholine by the procedure of Example 1.

EXAMPLE 7

Preparation of N-(2-morpholinoethyl)-6-trifluoromethyl-2-indolecarboxamide

When 6-trifluoromethylindole-2-carbonyl chloride is reacted with N-(2-aminoethyl)morpholine by the procedure of Example 1, this compound is obtained.

EXAMPLE 8

Preparation of 6-chloro-1,3-dimethyl-N-(2-morpholinoethyl)-2-indolecarboxamide

This compound is obtained when 6-chloro-1,3-dimethyl-2-indolecarbonyl chloride is substituted for 6-chloroindole-2-carbonyl chloride in the procedure of Example 1.

EXAMPLE 9

Preparation of 6-chloro-N-(3-morpholinopropyl)-2-indolecarboxamide

If 3-morpholinopropylamine is substituted for N-(2-aminoethyl)morpholine in the procedure of Example 1, this compound is obtained.

EXAMPLE 10

Preparation of 6-chloro-N-(1-methyl-2-morpholinoethyl)-2-indole-carboxamide

By reacting 6-chloroindole-2-carbonyl chloride with N-(2-aminopropyl)morpholine by the procedure of Example 1, this compound is obtained.

EXAMPLE 11

Preparation of 6-chloro-N-(4-morpholinobutyl)-2-indole-carboxamide

The above compound is obtained when N-(4-aminobutyl)-morpholine is substituted for N-(2-aminoethyl)morpholine in the procedure of Example 1.

EXAMPLE 12

Preparation of 6-chloro-N-(3-morpholinopropyl)-2-indolecarboxamide

A solution of 3 parts of 6-chloroindole-2-carbonyl chloride in 30 parts of ether is added with cooling and stirring to a mixture of 3.5 parts of 3-bromopropylamine hydrobromide, 5.3 parts of sodium carbonate, 25 parts of water and 100 parts of ether. The mixture is shaken at intervals, left for 20 hours at room temperature and then diluted with 25 parts of water and filtered. The insoluble portion is washed with water and ether and then melts at 173°–175° C. This is N-(3-bromopropyl)-6-chloroindole-2-carboxamide.

A mixture of 0.8 part of N-(3-bromopropyl)-6-chloroindole-2-carboxamide, 2-parts of morpholine and 25 parts of benzene is heated on the steam bath for 4 hours and then concentrated to remove the solvent. The residue is triturated with 5 part of 1 N sodium hydroxide and filtered. The precipitate is washed with water and dried. The 6-chloro-N-(3-morpholinopropyl)-2 - indolecarboxamide melts at 204°–206° C. The hydrochloride melts at 217–219° C.

EXAMPLE 13

Preparation of 6-chloro-N-[3-(3,5-dimethylmorpholino)propyl]-2-indolecarboxamide This compound, melting point 166°–168° C., is obtained when 3,5-dimethylmorpholine is substituted for morpholine in the procedure of Example 12.

EXAMPLE 14

Preparation of 6-chloro-N-[3-(2,6-dimethylmorpholino)propyl]-2-indolecarboxamide The above compound, melting point 168°–170° C., is obtained when the morpholine is replaced by 2,6-dimethylmorpholine in the procedure of Example 12.

EXAMPLE 15

Preparation of 5-bromo-N-(3-morpholinopropyl)-2-indolecarboxamide

This compound, melting point 224°–226° C., is obtained when 5-bromoindole-2-carbonyl chloride is reacted with N-(3-aminopropyl)morpholine by the procedure of Example 1.

EXAMPLE 16

Preparation of 6-chloro-N-[2-(2,6-dimethylmorpholino)ethyl]-2-indolecarboxamide

A solution of 10 parts of 6-chloroindole-2-carbonyl chloride in 100 parts of ether is added with cooling and stirring to a mixture of 11 parts of 2-bromoethylamine hydrobromide, 19 parts of sodium carbonate, 300 parts of ether and 100 parts of water. The mixture is shaken at intervals, left at room temperature for 20 hours, and the layers are separated. The ether layer is washed with water and concentrated. The solid residue is washed out with water and dried. This is crude N-(2-bromoethyl)-6-chlorindole-2-carboxamide.

A mixture of 1.5 parts of the N-(2-bromoethyl)-6-chloroindole-2-carboxamide, 2 parts of 2,6-dimethylmorpholine and 2.5 parts of benzene is heated on the steam bath for 4 hours. The mixture is cooled and 8 parts of 1 N sodium hydroxide and 75 parts of benzene are added. The layers are separated and the benzene layer is washed with water and concentrated. The solid residue is recrystallized from ethyl acetate. The 6-chloro-N-[2-(2,6-dimethylmorpholino)ethyl]-2-indolecarboxamide melts at 170°–171° C.

EXAMPLE 17

Preparation of 6-chloro-N-[2-(2-methylmorpholino)ethyl]-2-indolecarboxamide

When 2-methylmorpholine is substituted for 2,6-dimethylmorpholine in the procedure of Example 16, this compound is obtained.

EXAMPLE 18

Preparation of 1-allyl-N-(2-morpholinoethyl)-2-indolecarboxamide

The above compound is obtained when 1-allyl-2-carbonyl chloride is reacted with N-(2-aminoethyl)morpholine by the procedure of Example 1.

EXAMPLE 19

Preparation of 1-ethyl-N-(2-morpholinoethyl)-2-indolecarboxamide

The above compound is obtained when 1-ethyl-2-indolecarbonyl chloride is reacted with N-(2-aminoethyl)morpholine using the procedure of Example 1.

EXAMPLE 20

Preparation of 1-methyl-N-(3-morpholinopropyl)-2-indolecarboxamide hydrochloride If 1-methyl-2-indolecarbonyl chloride is reacted with N-(3-aminopropyl)morpholine by the procedure of Example 1, this compound, melting point 198–200° C. is obtained.

EXAMPLE 21

Preparation of N-(2-morpholinoethyl)-2-indolecarboxamide hydrochloride

This compound, melting point 236–238° C. is obtained when indole-2-carboxylic acid is substituted for 6-chloroindole-2-carboxylic acid in the procedure of Example 1.

EXAMPLE 22

Preparation of N-(3-morpholinopropyl)-2-indolecarboxamide hydrochloride

When indole-2-carbonyl chloride is reacted with N-(3-aminopropyl)morpholine by the procedure of Example 1, the above compound, melting point 200–202° C., is obtained.

EXAMPLE 23

Preparation of 6-methyl-N-(2-morpholinoethyl)-2-indolecarboxamide

When 6-methylindole-2-carboxylic acid is substituted for 6-chloroindole-2-carboxylic acid in the procedure of Example 1, the above compound is obtained.

EXAMPLE 24

Preparation of 1-methyl-N-(2-morpholinoethyl)-2-indolecarboxamide hydrochloride

If 1-methylindole-2-carboxylic acid is substituted for 6-chloroindole-2-carboxylic acid in the procedure of Example 1, the above compound, melting point 189–191° C. is prepared.

What is claimed is:

1. A morpholinoalkylene-2-indole-carboxamide of the formula:

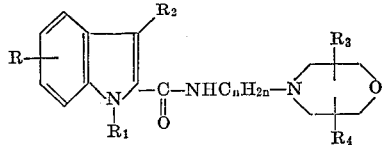

wherein R is selected from the group consisting of hydrogen, lower alkyl, halogen and trifluoromethyl; $R_1$ is selected from the group consisting of hydrogen, lower alkyl and allyl; $R_2$, $R_3$ and $R_4$ are selected from the group consisting of hydrogen and lower alkyl; $n$ is an integer from 2 to 4 or pharmaceutically acceptable acid addition salts.

2. The morpholinoalkylene - 2-indolecarboxamide according to claim 1, 6-chloro-N-(3-morpholinopropyl)-2-indolecarboxamide.

3. The morpholinoalkylene - 2-indolecarboxamide according to claim 1, 6-chloro-N-(2-morpholinoethyl)-2-indolecarboxamide.

4. The morpholinoalkylene - 2-indolecarboxamide according to claim 1, 1-methyl-N-(3-morpholinopropyl)-2-indolecarboxamide.

5. The morpholinoalkylene-2 - indolecarboxamide according to claim 1, N-(2-morpholinoethyl)-2-indolecarboxamide.

6. The morpholinoalkylene - 2-indolecarboxamide according to claim 1, 4-chloro-N-(2-morpholinoethyl)-2-indolecarboxamide.

7. The morpholinoalkylene - 2-indolecarboxamide according to claim 1, 5-bromo-N-(2-morpholinoethyl)-2-indolecarboxamide.

8. The morpholinoalkylene - 2-indolecarboxamide according to claim 1, N-(3-morpholinopropyl)-2-indolecarboxamide.

9. The morpholinoalkylene - 2-indolecarboxamide according to claim 1, 5-chloro-N-(2-morpholinoethyl)-2-indolecarboxamide.

10. The morpholinoalkylene-2-indolecarboxamide according to claim 1, 1-methyl-N-(2-morpholinoethyl)-2-indolecarboxamide.

No references cited.

ALEX MAZEL, Primary Examiner
JOSE TOVAR, Assistant Examiner

U.S. Cl. X.R.
424—248